(12) United States Patent
Henrich et al.

(10) Patent No.: US 6,277,336 B1
(45) Date of Patent: Aug. 21, 2001

(54) MOUNTABLE CONTACT ELEMENT FOR A TUBE WITH AN EXTERNAL ELECTRODE

(75) Inventors: Peter Henrich, Krittel; Siegfried Guenther, Eppstein; Guenter Riege, Wiesbaden, all of (DE)

(73) Assignee: Schott-Geraete GmbH, Hofheim (DE)

( * ) Notice: Subject to any disclaimer, the term of this patent is extended or adjusted under 35 U.S.C. 154(b) by 0 days.

(21) Appl. No.: 09/445,877

(22) PCT Filed: May 26, 1998

(86) PCT No.: PCT/EP98/03080

§ 371 Date: Feb. 23, 2000

§ 102(e) Date: Feb. 23, 2000

(87) PCT Pub. No.: WO98/57885

PCT Pub. Date: Dec. 23, 1998

(30) Foreign Application Priority Data

Jun. 17, 1997 (DE) ................................. 197 25 524

(51) Int. Cl.[7] .................................................. B01J 19/08
(52) U.S. Cl. .................. 422/186.07; 204/297.01
(58) Field of Search ............... 422/186.07, 186; 204/297.01

(56) References Cited

U.S. PATENT DOCUMENTS

| | | | |
|---|---|---|---|
| 4,650,573 | * | 3/1987 | Nathanson ........................ 210/136 |
| 4,877,588 | * | 10/1989 | Ditzler et al. .................. 422/186.07 |
| 5,002,739 | * | 3/1991 | Ditzler et al. .................. 422/186.07 |

* cited by examiner

Primary Examiner—Kathryn Gorgos
Assistant Examiner—Thao Tran
(74) Attorney, Agent, or Firm—Michael J. Striker

(57) ABSTRACT

The mountable contact element (1) for making an electrical contact with an external electrically conductive coating (22) on a nonconductive tube (20) on which the contact element is secured includes two contact rings (3,4) spaced axially from each other and each provided with interiorly extending contact brushes (5,6) peripherally encompassing the electrically conductive coating (22) and three axially extending ribs (7,8,9) spaced 120° C. from each other connecting the contact rings (3,4) mechanically and electrically conductively with each other and holding them spaced apart axially. The axially extending ribs (7,8,9) are connected to each other at a common connection point (10) on a threaded bolt (11). An ozonizer including the nonconductive tube (20) with the external electrically conductive coating (22) acting as a first electrode, a second external electrode separated from the first electrode with a dielectric and the contact element (1) is also described.

6 Claims, 1 Drawing Sheet

MOUNTABLE CONTACT ELEMENT FOR A TUBE WITH AN EXTERNAL ELECTRODE

BACKGROUND OF THE INVENTION

1. Field of the Invention

The invention relates to a mountable contact element for a tube of an electrically nonconductive material, which has an encompassing external electrically conductive coating as its electrode.

2. Prior Art

In certain technical applications, the problem arises of establishing a mountable, mechanically stable and electrically very highly conductive, high-voltageproof contact means with an electrode that is mounted as an electrically conductive encompassing external coating on a tube of an electrically nonconductive material, especially glass or glass ceramic.

One such application is for instance in a tube ozonizer of the kind described in German Patent Disclosure DE 195 11 001 A1. The following demands are made of a contacting means for such externally coated glass cylinders that are used as ozone tubes:

high ozone resistance high voltage strength low transfer resistance between contact and glass tube despite great roughness of the conductive glass coating contacting over the entire circumference of the cylinder in the contact region firm mechanical seat on the glass tube minimal external dimensions assurance that neither the coating nor the glass can be damaged when the contact is being assembled lowest possible expense for assembly and disassembly.

In other applications, comparable demands must be met. The aforementioned German patent disclosure does not show any constructively specific embodiment of a contact element that would meet the above demands.

In particular the demand for low transfer resistance precludes the conventional contacting means, such as contacts in the form of sleeves that surround the region to be contacted in jacket-like fashion.

One such contacting means has become known for instance from German Patent Disclosure DE 26 06 731 B2, which discloses a tubular ozone generator with an external electrode, preferably in the form of a metal foil on a glass tube. This external electrode is surrounded by an axially segmented outer jacket. The segments are held together by clamping devices, which press the external electrode onto the glass tube and also press the external jacket onto the external electrode. One pole of the high-voltage source is then connected to this outer jacket. It is impossible in principle to create a continuous areal contact between the outer jacket and the external electrode in this way.

SUMMARY OF THE INVENTION

The object of the invention is to embody the mountable contact element defined at the outset in such a way that it meets the above demands in a application-specific way.

This object is attained according to the invention in that two axially spaced-apart contact rings with electrically conductive and mechanically stabilizing connection elements to the electrode are provided, which for at least one contact ring are embodied as peripherally encompassing contact brushes, and that the contact rings are connected to one another mechanically and electrically conductively via axially extending ribs that are carried to a common connection point.

The two axially spaced-apart contact rings joined together by ribs assure a firm mechanical seat on the externally coated tube, with minimal external dimensions. The contact brushes assure a low transfer resistance, despite the quasinatural roughness of the conductive external coating, and also assure a high-voltage proof contacting over the entire circumference of the cylinder in the contact region. The contact element can be mounted on the coated tube and removed from it again, both at little effort or expense, and the construction assures that in the assembly/disassembly, neither the coating nor the tube itself can be damaged.

By a suitable choice of material, it can also be assured that the contact element has high resistance to ambient aggressive media, such as ozone.

In a preferred, advantageous feature of the invention, both contact rings are provided with peripherally encompassing contact brushes. However, it is fundamentally conceivable instead to embody only one contact ring as a brush ring, which primarily forms the electrical contact, and merely to provided solid guide elements on the second contact ring, which assure primarily a secure mechanical, or in other words "non-wobbling" hold on the coated tube.

U.S. Pat. No. 4,877,588 describes a tube ozonizer, which comprises a dielectric cylinder coaxial with and surrounded in spaced-apart fashion by a conductive cylindrical partition acting as an external electrode. The dielectric cylinder has a plurality of conductive regions on the inside acting as an internal electrode, to which a high voltage can be applied. The high voltage supply line comprises a rigid conductor, which is disposed in the center of the dielectric cylinder and has an external high-voltage contact and which in each case at the level of the internal conductive regions of the dielectric cylinder has brush contacts, extending radially in an arc of 360°, for transmitting the high voltage from the central conductor to the internal electrode.

Since in the known case the brush contacts are provided only for making contact in stationary fashion and are also embodied accordingly, they cannot provide any suggestion toward solving the technical problem on which the invention is based, namely of furnishing a mechanically stable and electrically very highly conductive, high-voltage proof, mountable contacting means to an electrode, which is applied in the form of an electrically conductive encompassing external coating onto a glass tube.

An especially favorable low transfer resistance and especially high resistance to aggressive media, especially ozone, can be attained according to a further feature of the invention if the contact rings, along with the contact brushes and the ribs, comprise steel having the designation ST 1.4571, and if in conjunction with this the bristles of the contact brushes have a diameter on the order of magnitude of 0.2 mm. The individual bristles, because of their slight diameter and their natural resilient properties, conform very well to a rough surface and therefore assure secure A symmetrical contact pressure and thus also guide pressure is obtained, in accordance with a further feature of the invention, if three ribs, peripherally offset by 120° each, are provided, or in other words if a three-point support is achieved.

BRIEF DESCRIPTION OF THE DRAWING

The objects, features and advantages of the invention will now be illustrated in more detail with the aid of the following description of the preferred embodiments, with reference to the accompanying figures which include.

DESCRIPTION OF THE PREFERRED EMBODIMENT

Figure 1:
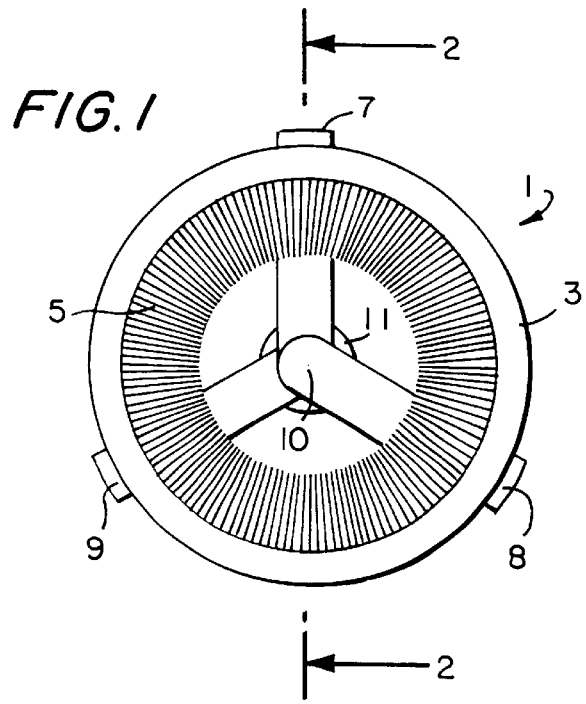
FIG. 1, a plan view on the opening of the contact element according to the invention, and FIG. 2, a longitudinal section through the contact element, taken along the section line A—A of FIG. 1.
Figure 2:
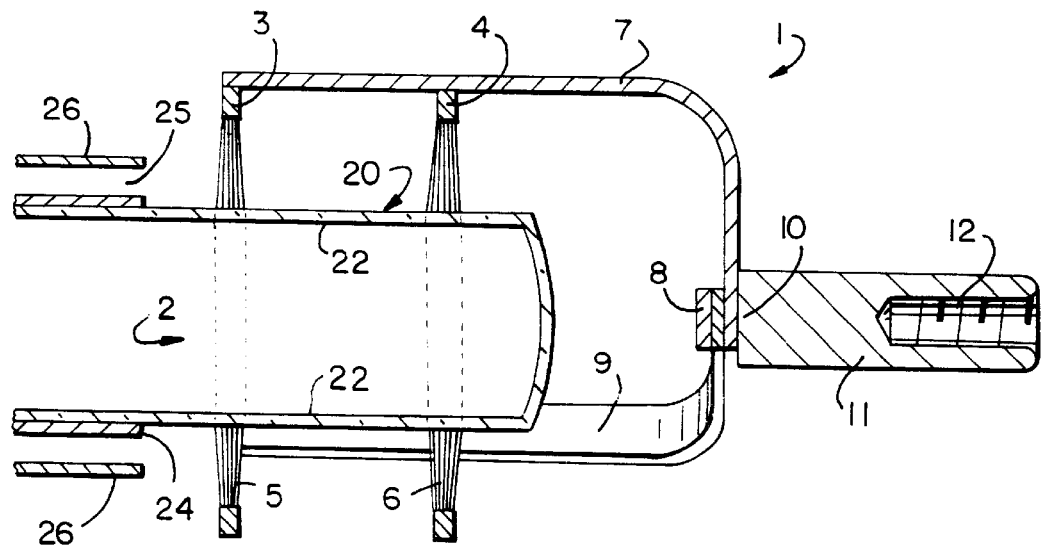

The figures show a contact element 1, which can be mounted via an opening 2 on a tube 20 of an electrically nonconductive material, preferably glass or glass ceramic, which as its electrode has an encompassing external electrically conductive coating 22. One such tube is the subject of DE 195 11 001 AI discussed above, and reference can accordingly be made thereto.

Instead of glass or glass ceramic as the material, a plastic of suitable hardness can also be used.

The contact element 1 has two axially spaced-apart contact rings 3, 4, both of which in their interior have peripherally encompassing contact brushes 5, 6 disposed in a circular ring.

The contact rings 3, 4 are connected mechanically and electrically to one another via three axially extending ribs 7, 8 and 9. The ribs are carried to a common connection point 10, where they are joined together, for instance by spot welding, in the same way that the ribs 7, 8, 9 are preferably joined to the contact rings 3, 4 by spot welding.

All the components of the contact element according to the invention are preferably made from steel with the designation St 1.4571 as the material.

The diameter of the bristles of the contact brushes 5, 6 in the brush rings 5, 6 is preferably 0.2 mm. The individual bristles, because of their slight diameter and their intrinsic resilient properties, then conform to the rough surface of the tube electrode and assure secure contacting.

A threaded bolt 11 is welded to the common connection point 10, and its female thread 12 corresponds to the screw connection of a conventional rod-like fuse. Thus in a tube ozonizer, for instance, in which a plurality of tubes are interconnected by the contact element of the invention, each individual tube can be secured, so that in the event of a malfunction, other tubes will not be affected.

By means of the two axially spaced-apart contact rings 3, 4, which each rest with their respective brush sets 5, 6 flush on the external coating of the tube, a mechanically highly stable contact element with excellent electrical properties is created. In tests, the transfer resistance between the contact element and the coated glass cylinder of 0.01 ohms did not vary upon axial and radial motion of the contact element during the measurement.

The contact element of the invention also allows an adaptation of the fuse element in the kilovolt range.

For connection to the externally coated glass cylinder, the contact element 1 is thrust with its opening 2 axially over the glass cylinder and at the same time is rotated radially; the connection is undone in an analogous way.

Preferably, a tube 20 that is provided with the contact element 1 of the invention is used in a tube ozonizer. To that end, the externally connected electrode 22 of the tube is provided, with a dielectric 24, with a discharge gap 25 between the dielectric and a second external coaxial electrode 26. By application of a high voltage of 5–20 kV at a frequency of approximately 50 Hz to the two electrodes and by introducing an oxygen-containing gas into the discharge gap, ozone is generated by silent discharge. Ozonizers of this kind are known for instance by the patent disclosure referred to at the outset, in which information on the materials used can also be found.

What is claimed is:

1. A mountable contact element (1) for making an electrical contact with an external electrically conductive coating (22) provided on a tube (20) of an electrically nonconductive material, said external electrically conductive coating extending completely around said tube, said mountable contact element (1) comprising two contact rings (3,4) spaced axially from each other and each mechanically connected with interiorly extending electrically conductive and mechanically stabilizing connection elements, said connection elements comprising means for making electrical connection and mechanical contact with said electrically conductive coating (22) on said tube (20) when the contact rings (3,4) are thrust over said tube (20), said connection elements of at least one of said contact rings (3,4) comprising an interiorly extending contact brush (5,6) that peripherally encompasses said electrically conductive coating (22); and a plurality of axially extending ribs (7,8,9) connecting said contact rings (3,4) mechanically and electrically conductively with each other and holding said contact rings (3,4) spaced apart axially, said axially extending ribs (7,8,9) being connected to each other at a common connection point (10).

2. The mountable contact element (1) as defined in claim 1, wherein both of said contact rings (3,4) have a respective interiorly extending contact brush (4,5).

3. The mountable contact element (1) as defined in claim 1, wherein said contact rings (3,4), said contact brush (4,5) and said ribs (7,8,9) comprise ST 1.4571 steel.

4. The mountable contact element (1) as defined in claim 1, wherein said contact brush has bristles and said bristles have respective diameters of about 0.2 mm.

5. The mountable contact element (1) as defined in claim 1, wherein said plurality of said ribs (7,8,9) consist of three of said ribs spaced 120° from each other.

6. An ozone generator comprising an electrically nonconductive tube (20) coated with an external electrically conductive coating (22) acting as a first external electrode;

a dielectric (24) surrounding the tube (20) and the external electrically conductive coating (22);

a second external electrode (26) coaxial to the tube (20) and spaced from the first external electrode by a dielectric gap (25); and a mountable connecting element (1) for making electrical connection with the first electrode, said mountable connecting element (1) comprising two contact rings (3,4) spaced axially from each other and each connected with interiorly extending electrically conductive and mechanically stabilizing connection elements, said connection element comprising means for making electrical connection and mechanical contact with said electrically conductive coating (22) on said tube (20) when the contact rings (3,4) are thrust over said tube (20), said connection elements of at least one of said contact rings (3,4) comprising an interiorly extending contact brush (5,6) and said interiorly extending contact brush (5,6) peripherally encompassing said electrically conductive coating (22); and a plurality of axially extending ribs (7,8,9) connecting said contact rings (3,4) mechanically and electrically conductively with each other and holding said contact rings (3,4) spaced apart axially, said axially extending ribs (7,8,9) being connected to each other at a common connection point (10).

* * * * *